US012721281B2

(12) United States Patent
Isomaa et al.

(10) Patent No.: US 12,721,281 B2
(45) Date of Patent: Sep. 1, 2026

(54) CUTTING TOOL

(71) Applicant: Fiskars Finland Oy Ab, Espoo (FI)

(72) Inventors: Matti Isomaa, Espoo (FI); Arho Happonen, Espoo (FI)

(73) Assignee: Fiskars Finland Oy Ab, Espoo (FI)

(*) Notice: Subject to any disclaimer, the term of this patent is extended or adjusted under 35 U.S.C. 154(b) by 109 days.

(21) Appl. No.: 18/420,583

(22) Filed: Jan. 23, 2024

(65) Prior Publication Data

US 2024/0245009 A1 Jul. 25, 2024

(30) Foreign Application Priority Data

Jan. 24, 2023 (EP) .................................... 23153068

(51) Int. Cl.
*A01G 3/02* (2006.01)
*A01G 3/047* (2006.01)

(52) U.S. Cl.
CPC .......... *A01G 3/021* (2013.01); *A01G 3/0475* (2013.01)

(58) Field of Classification Search
CPC .......... A01G 3/02; A01G 3/021; A01G 3/025; A01G 3/0251; A01G 3/0475; B26B 13/28
USPC .................................................... 30/250–252
See application file for complete search history.

(56) References Cited

U.S. PATENT DOCUMENTS 326,314 A * 9/1885 McKay .................. A01G 3/025 30/250
374,480 A * 12/1887 Klein ...................... B26B 13/00 30/191
707,822 A * 8/1902 Casterlin ................. B26B 17/02 30/193
713,595 A * 11/1902 Broman ................. A01G 3/025 30/252
832,804 A * 10/1906 Oneal et al. ............ B26B 17/02 30/193
1,012,289 A * 12/1911 Stich ...................... A01G 3/025 30/250
1,046,852 A * 12/1912 Prince .................... A01G 3/025 30/252

(Continued)

FOREIGN PATENT DOCUMENTS

| CN | 111373944 | 7/2020 |
|---|---|---|
| CN | 216492143 | 5/2022 |

(Continued)

OTHER PUBLICATIONS

1 Extended Search Report for EP23153068.4, dated Jul. 6, 2023, 7 pages.

(Continued)

*Primary Examiner* — Jason Daniel Prone
(74) *Attorney, Agent, or Firm* — Nixon & Vanderhye PC

(57) ABSTRACT

A cutting tool includes a first blade having a cutting edge, a second blade having a cutting edge, and pivotally connected to the first blade at a first pivot point. A first handle is pivotally connected to the first blade at a second pivot point, a second handle is pivotally connected to the second blade at a third pivot point, the first handle is pivotally connected to the second handle at an adjustable fourth pivot point, and the cutting tool further includes a switch arrangement including a switch allowing a user to change location of the fourth pivot point from a proximal pivot point to a distal pivot point.

13 Claims, 6 Drawing Sheets

(56) References Cited

U.S. PATENT DOCUMENTS 1,254,284 A * 1/1918 Southwood ............ A01G 3/025 30/252
1,321,825 A * 11/1919 Heimerdinger .......... A01G 3/02 30/131
1,787,512 A * 1/1931 Crampton ............... B26B 13/28 30/266
2,010,576 A * 8/1935 Whyte ................. A01G 3/0475 30/271
2,073,460 A * 3/1937 Vosbikian et al. ... A01G 3/0475 30/271
2,074,239 A * 3/1937 Rush ........................ A01G 3/02 30/252
2,090,228 A * 8/1937 Porter et al. ......... A01G 3/0251 30/252
2,290,203 A * 7/1942 Nikonow et al. ....... B26B 13/28 30/241
2,562,828 A * 7/1951 Smyth ...................... A01G 3/02 30/271
2,929,141 A * 3/1960 Vosbikian et al. ... A01G 3/0475 30/261
3,006,072 A * 10/1961 Nicoletta ............. A01G 3/0251 30/266
3,324,549 A * 6/1967 Sharp ....................... A01G 3/02 30/193
3,390,455 A * 7/1968 Florian ................ A01G 3/0251 30/251
3,422,532 A 1/1969 Ballard
3,460,251 A * 8/1969 Somervell et al. .. A01G 3/0475 30/254
3,470,613 A * 10/1969 Keiser, Jr. ............ A01G 3/0475 30/268
3,562,908 A * 2/1971 Rogers ..................... A01G 3/02 30/261
3,566,467 A * 3/1971 Keiser, Jr. ............ A01G 3/0475 30/257
4,422,240 A * 12/1983 Wallace ............... A01G 3/0475 30/254
4,525,929 A * 7/1985 Brophy, Sr. .......... A01G 3/0251 30/251
5,159,757 A * 11/1992 Weid .................... A01G 3/0251 30/251
5,267,400 A * 12/1993 Danube ................ A01G 3/0475 30/250
5,325,591 A * 7/1994 Orthey ................. A01G 3/0251 30/252
5,454,165 A * 10/1995 Thompson ........... A01G 3/0251 30/249
5,511,314 A * 4/1996 Huang ................. A01G 3/0251 30/251
5,709,030 A * 1/1998 Wang ................... A01G 3/0251 30/251
5,761,815 A * 6/1998 Lin ...................... A01G 3/0251 30/251
6,088,920 A * 7/2000 Schmick .............. B23D 29/023 30/252
6,493,943 B1 * 12/2002 Linden ................. A01G 3/0475 30/252
6,662,451 B1 * 12/2003 Cheng .................. A01G 3/0475 30/177
6,671,967 B1 * 1/2004 Huang ................. A01G 3/0251 30/254
7,346,991 B1 * 3/2008 Janson ..................... A01G 3/02 30/252
7,640,666 B1 * 1/2010 Huang ................. A01G 3/0475 30/252
8,572,853 B2 * 11/2013 Huang ................. A01G 3/0251 30/239
9,027,253 B2 * 5/2015 Huang .................... B26B 13/28 30/252
9,591,808 B2 * 3/2017 Lin ...................... A01G 3/0251
10,201,131 B1 * 2/2019 Huang ................... A01G 3/021
11,911,923 B2 * 2/2024 Panosian ................. B26B 13/26
12,310,300 B2 * 5/2025 Chan .................... A01G 3/0251
12,471,539 B2 * 11/2025 Chan ...................... A01G 3/021
2014/0298661 A1 10/2014 Carmichael
2018/0001491 A1 * 1/2018 Sandefur ................ A01G 3/037
2024/0389516 A1 * 11/2024 Chen .................... A01G 3/0251

FOREIGN PATENT DOCUMENTS

CN 116671351 9/2023
CN 117356277 A * 1/2024 ............. A01G 3/021
CN 118383175 A * 7/2024 ............. A01G 3/021
CN 120391211 A * 8/2025 ........... A01G 3/0251
EP 3879965 B1 9/2022
EP 4406404 A1 * 7/2024 ............. A01G 3/021
FR 2532235 3/1984

OTHER PUBLICATIONS

Sep. 25, 2025 Office Action issued in Chinese Patent Application No. 202410095377.3, pp. 1-8 [English translation included].

* cited by examiner

CUTTING TOOL

CROSS-REFERENCE TO RELATED APPLICATIONS

This application claims priority to EP 23153068.4 filed Jan. 24, 2023, the entire contents of which are hereby incorporated by reference.

TECHNICAL FIELD

The present invention relates to a cutting tool and more precisely to a cutting tool with an adjustable pivot point.

BACKGROUND

Conventionally, cutting tools such as hedge shears have two handles with blades arranged as axial extensions of the handles. These handle-and-blade combinations are pivotally connected at only one pivot point, which is typically located on the blades, close to the point where the blades are attached to the handles.

The cutting force that can be applied to the branches to be cut is directly proportional to the force used for bringing the handles toward each other. This is based on a typical lever construction where the cutting force can be increased by extending the length of the handles.

It is well known, when cutting thicker branches, longer lever i.e. handles would produce greater cutting force for facilitating the cutting. On the other hand, shorter lever would produce faster cutting speed which may be more beneficial for cutting thinner branches. Some cutting tools utilize gears for obtaining better speed advantage while increasing or decreasing the turning speed. However, in solutions where user can choose between two or more advantages, the cutting motion is not symmetric which affects targeting the correct branches to be cut.

A challenge is how to switch between greater cutting force and speed while maintaining symmetric handle movement.

BRIEF DESCRIPTION

An object of the present invention is to solve the above-mentioned drawbacks and to provide a new type of cutting tool.

This and other objects are achieved with the cutting tool according to the independent claim. Preferred embodiments are disclosed in dependent claims.

The cutting tool is based on the idea of comprising three pivot points and a fourth changeable pivot point.

One of the advantages obtained from this invention is possibility to change the length of the lever. The user can switch the fourth pivot point further from the handles when cutting thick branches for greater cutting force and closer to the handles when cutting thin branches for faster speed.

BRIEF DESCRIPTION OF THE DRAWINGS

In the following the invention will be described in greater detail by means of preferred embodiments with reference to the attached drawings, in which.

DETAILED DESCRIPTION

Figure 1:
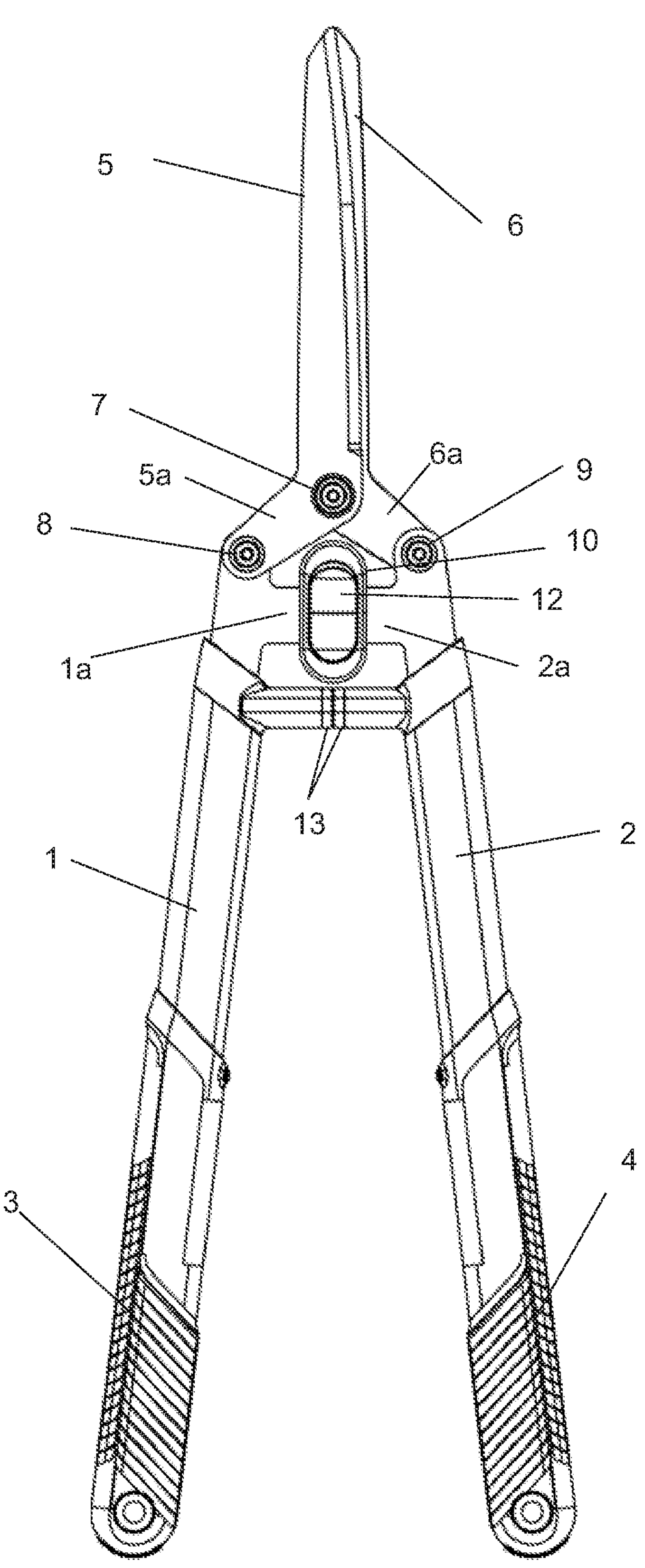
FIG. 1 illustrates a cutting tool in closed position according to an embodiment.

The present invention pertains to a cutting tool, particularly hedge shears. FIG. 1 illustrates a cutting tool in a fully closed position according to an embodiment. The cutting tool comprises a first blade 5 having a cutting edge and a second blade 6 having a cutting edge. The second blade 6 is pivotally connected to the first blade 5 at a first pivot point 7. The cutting tool further comprises a first handle 1 and a second handle 2 which are elongated and may comprise gripping portions 3 and 4, for instance made of moldable material, arranged close to one end of the handles 1, 2 for better grip. The first handle 1 is pivotally connected to the first blade 5 at a second pivot point 8, and the second handle 2 is pivotally connected to the second blade 6 at a third pivot point 9. The second pivot point 8 and the third pivot point 9 are located at the handle 1, 2 ends closer to the blades 5, 6 and opposite to the gripping portions 3, 4.

Additional second and third pivot points 8, 9 provide more leverage and thus easier cutting by increasing the cutting force of the blades 5, 6 when the blades 5, 6 are approaching their closed position, without an extra effort being required from the user. When the handles 1, 2 are moved towards each other, the second and third pivot points 8, 9 move farther from each other, this causing the first and second blades 5, 6 to approach each other.

The first and second blades 5, 6 are formed so that below the first pivot point 7, they may comprise portions **5*a*, 6*a* bent outward with regard to the symmetry axis of the cutting tool, wherein the portions 5*a*, 6*a* form a bend or an acute angle to the longitudinal axes of the blades 5, 6. Due to this, the blades 5, 6 are not straight below the first pivot point 7**, as they do in conventional scissors or hedge shears.

The first blade 5 and the first handle 1 may be substantially symmetric to the second blade 6 and the second handle 2, and distances between the first and the second pivot point 7, 8, and the first and the third pivot point 7, 9 may be identical. However, in some embodiments, such symmetry or identicality is not necessary and a small deviation is permissible.

The blades 5, 6 may be fully identical and made of suitable steel. The first, second and third pivot points 7, 8, 9 may be implemented by means of an axle stub, pin or rivet or nuts and bolts made of metal, for instance. If metal nuts and bolts are utilized, the holes are preferably same size instead of one being smaller than the other.

The cutting tool further comprises a switch arrangement 10 joining the first handle 1 and the second handle 2 together. The switch arrangement 10 is preferably located between the handles 1, 2 and at the same end of the handles 1, 2 as the second and third pivot points 8, 9, which are at the outer edge of the handles 1, 2. The switch arrangement 10 may be arranged at a suitable and equal distance from both second and third pivot points 8, 9 by molding the handles 1, 2 so that protrusions 1*a*, 2*a*, projecting sideways from the handles 1, 2 are provided between the handles 1, 2.

The first handle 1 is pivotally connected to the second handle 2 at an adjustable fourth pivot point, wherein the fourth pivot point is switchable between a proximal pivot point 11*a* and a distal pivot point 11*b*.

The switch arrangement 10 comprises a switch 12 allowing a user to change location of the adjustable fourth pivot point from the proximal pivot point 11*a* to the distal pivot point 11*b*, and vice versa. The term "proximal pivot point" in this context refers to the pivot point of the switch arrangement 10 situated closer to the user or the gripping portions 3, 4, and the term "distal pivot point" in this context refers to the pivot point of the switch arrangement 10 situated closer to the blades 5, 6.

Distances between the second pivot point 8 and the fourth adjustable pivot point, and the third pivot point 9 and the fourth adjustable pivot point may also be identical. The cutting tool with respect to its longitudinal axis in its fully closed position may be substantially symmetrical, wherein the symmetry axis of the cutting tool passes through the first and fourth pivot points. Especially, the proximal pivot point 11*a* and the distal pivot point 11*b* and the first pivot point 7 may locate on said symmetry axis, when the cutting tool is in the fully closed position. However, in some embodiments, the fourth adjustable pivot point may deviate from the symmetry axis.

The four pivot points form a quadrangle. When the proximal pivot point 11*a* of the fourth adjustable pivot point is engaged and active, the formed quadrangle is larger than the quadrangle formed with the distal pivot point 11*b*. When the handles 1, 2 are being rotated about the fourth adjustable pivot point away from each other, the second pivot point 8 and the third pivot point 9 move closer to each other while the first pivot point 7 and the fourth adjustable pivot point move farther apart from each other, thus causing the blades 5, 6 to separate from each other from the closed position to the open position.

The handles 1, 2 may further comprise shock absorbers 13 which are additionally projecting sideways from the handles 1, 2 and provided between the handles 1, 2. The shock absorbers 13 are arranged to contact and abut each other when the cutting tool is in the fully closed position. The shock absorbers 13 may be located close to the protrusions 1*a*, 2*a*, wherein the switch arrangement 10 is provided between the first pivot point 7 and the shock absorbers 13. The shock absorbers 13 may be made of rubber and are arranged to soften the effect of an impact on the user's joints by absorbing redundant power when the cutting tool moves from the open position to the fully closed position.

Figure 2:
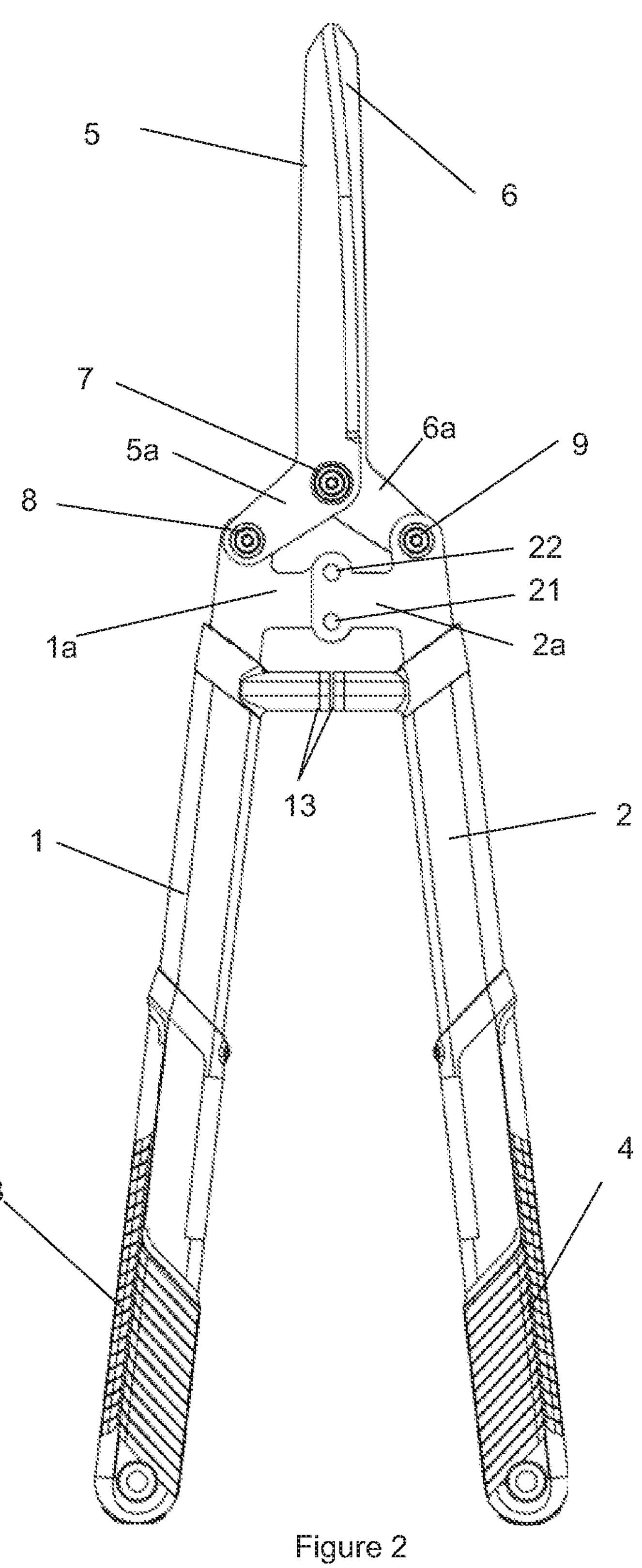
FIG. 2 illustrates the cutting tool of FIG. 1 without a switch arrangement.

FIG. 2 illustrates the cutting tool of FIG. 1 without a switch arrangement 10. FIG. 2 is very similar to the one explained in connection with FIG. 1 but without implementing the switch arrangement 10. The protrusions 1*a*, 2*a*, projecting sideways from the handles 1, 2 may have an enlarged end, further protruding from the protrusions 1*a*, 2*a*, which may comprise a first aperture 21 and a second aperture 22. The enlarged end may be oval-shaped, as illustrated in FIG. 2, or alternatively circular-shaped or rectangular-shaped or in any other suitable shape. In some embodiments, the end may not be enlarged but instead reduced or equal to the dimensions of the protrusions 1*a*, 2*a*.

The first aperture 21 and the second aperture 22 in this embodiment are arranged as circular holes wherein the first apertures 21 of both protrusions 1*a*, 2*a* are arranged to completely align with each other, and the second apertures 22 of both protrusions 1*a*, 2*a* are arranged to completely align with each other when the cutting tool is in the fully closed position.

Figure 3:
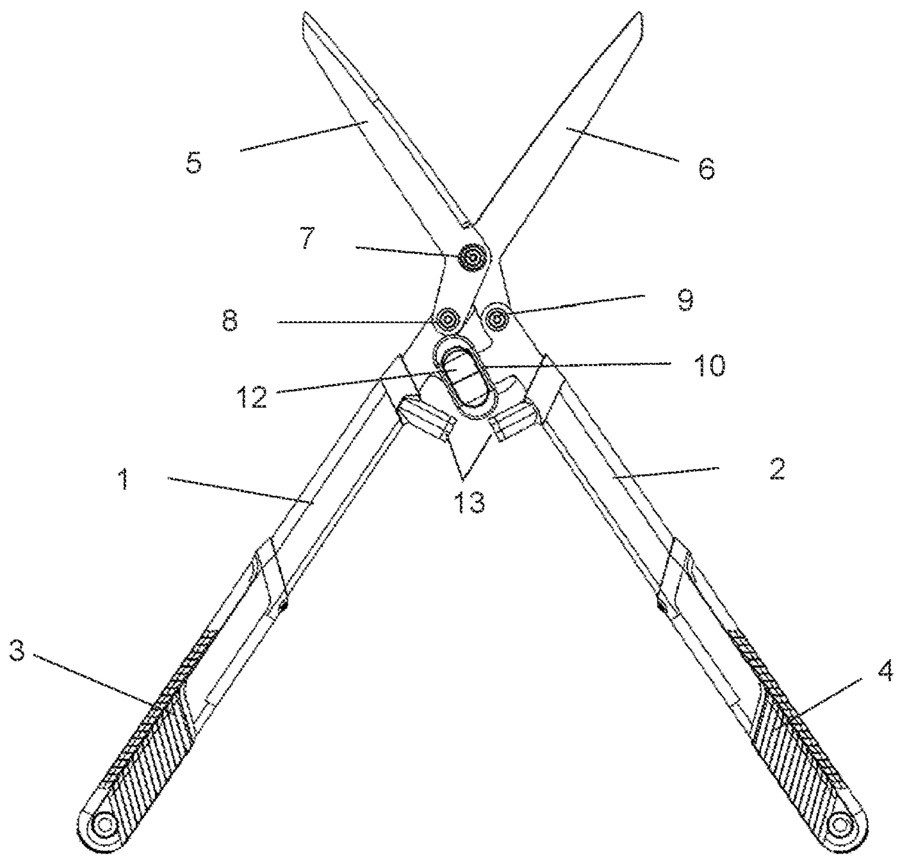
FIG. 3 illustrates the cutting tool of FIG. 1 in an open position when a proximal pivot point is selected.
Figure 4:
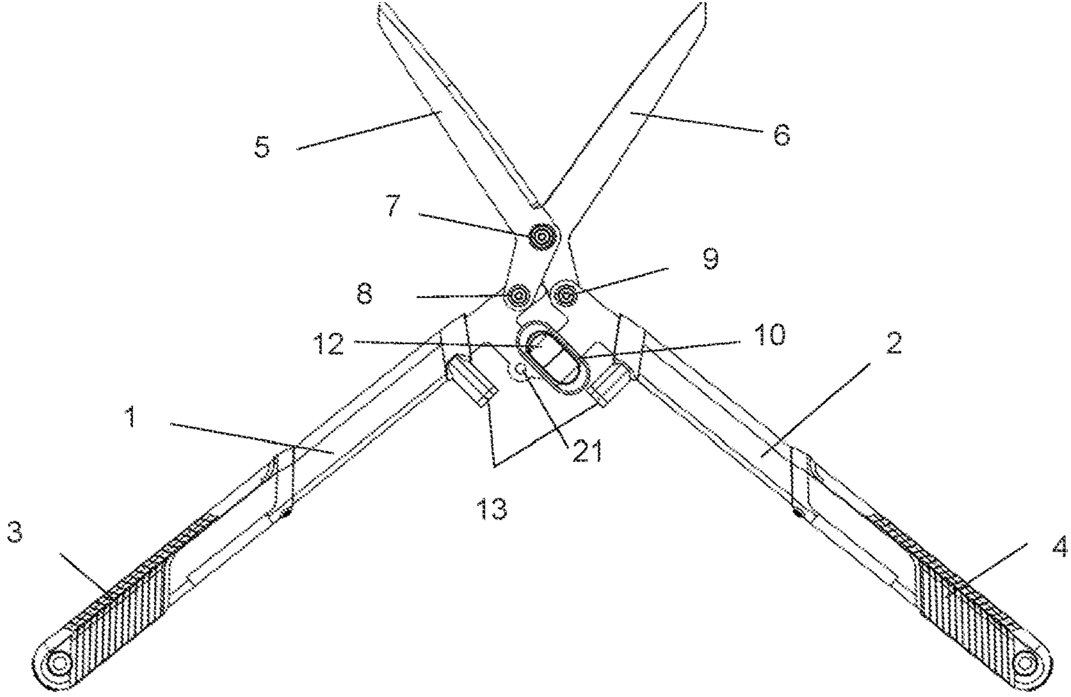
FIG. 4 illustrates the cutting tool of FIG. 1 in an open position when a distal pivot point is selected.

FIG. 3 illustrates the cutting tool of FIG. 1 in a fully open position when a proximal pivot point 11*a* is engaged. FIG. 4 illustrates the cutting tool of FIG. 1 in a fully open position when the distal pivot point 11*b* is engaged. When the proximal pivot point 11*a* is selected and active, the lever distance is shorter compared to the lever distance of the distal pivot point 11*b*. This allows the cutting speed of the blades to increase. On the other hand, when the distal pivot point 11*b* is selected and active, the lever distance is longer compared to the lever distance of the proximal pivot point 11*a*. This allows the cutting force of the blades to increase by longer level and by permitting the handles 1, 2 to be opened wider, which in turn opens the blades 5, 6 wider to accept thicker or denser branches.

Figure 5:
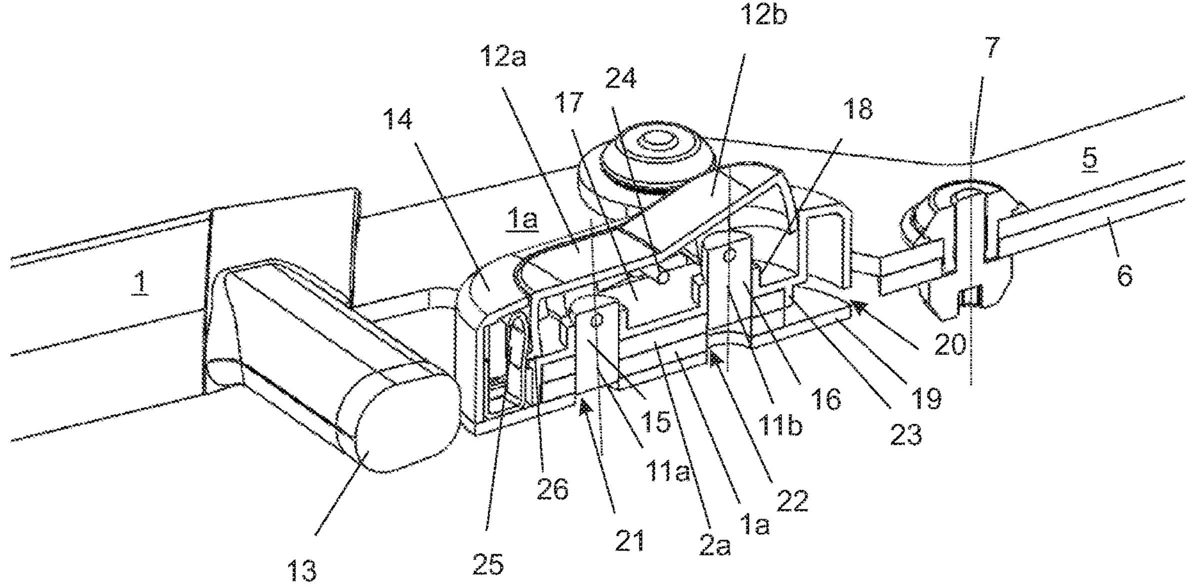
FIG. 5 illustrates a perspective cross-sectional view of a switch arrangement according to an embodiment.

FIG. 5 illustrates a perspective cross-sectional view of a switch arrangement 10 according to an embodiment. In this embodiment, the switch arrangement 10 may comprise a housing 14. The housing 14 in this context may refer to any type of casing or cover to protect or support at least partially of the switch 12, or to facilitate attaching the switch arrangement 10 to the cutting tool. However, in some embodiments, the housing 14 may not be necessary.

As illustrated in the accompanying Figures, the first protrusion 1*a* is projected from the first handle 1 and the second protrusion 2*a* is projected from the second handle 2. The protrusions 1*a*, 2*a* may be any shape but designed to project sideways from the handles 1, 2 and provided between the handles 1, 2 so that the protrusions 1*a*, 2*a* are arranged to be connected to each other via the fourth adjustable pivot point. Said protrusions 1*a*, 2*a* may have at least one planar surface wherein the protrusions 1*a*, 2*a* are slidable in relation to each other. Each of the first and second protrusions 1*a*, 2*a* may comprise the first aperture 21 and the second aperture 22, wherein said first apertures 21 and second apertures 22 of each protrusion 1*a*, 2*a* are aligned when the cutting tool is in a fully closed position. The fourth adjustable pivot point is configured to locate at the first apertures 21 when the proximal pivot point 11*a* is engaged, and at the second apertures 22 when the distal pivot point 11*b* is engaged.

FIG. 5 illustrates a perspective cross-sectional view of a switch arrangement according to an embodiment. The switch 12 may be a rocker switch comprising a first part 12*a* and a second part 12*b*. When the first part 12*a* is raised, the second part 12*b* is depressed, and vice versa. The first part 12*a* may be connected to a first pin 15, and the second part 12*b* may be connected to a second pin 16. Said pins 15, 16 may be identical and designed as cylindrical shape. However, in some embodiments, the shape of the pins may vary, for example having different diameters.

The first part 12*a* or the second part 12*b* may be fixedly connected to the closest end of the respective first pin 15 or the second pin 16. The first pin 15 may be arranged to pass through the first apertures 21 of both first protrusion 1*a* and second protrusion 2*a* at the proximal pivot point 11*a* when the first part 12*a* of the rocker switch is activated or pressed. The second pin 16 may be arranged to pass through the second apertures 22 of both first protrusion 1*a* and second protrusion 2*a* at the distal pivot point 11*b* when the second part 12*b* of the rocker switch is activated or pressed.

When the first part 12*a* is activated or pressed, the second pin 16 may be arranged to be raised, along with the second part 12*b*, so that it only passes through one or none of the second apertures 22 of the protrusions 1*a*, 2*a*. This allows the handles 1, 2 to rotate around the proximal pivot point 11*a*. Correspondingly, when the second part 12*b* is activated or pressed, the first pin 15 may be arranged to be raised, along with the first part 12*a*, so that it only passes through one or none of the first apertures of the protrusions 1*a*, 1*b*, which allows the handles 1, 2 to rotate around the distal pivot point 11*b*. The fourth pivot point may be switchable only when the cutting tool is in the fully closed position, wherein both first apertures 21 and the second apertures 22 are aligned.

The switch 12 can alternatively be any switch suitable for changing between at least two positions, such as a slide switch, a push button switch, a rotary switch, or a toggle switch, for example, and some of them are also illustrated in FIGS. 6-9. The basic principle for being able to change the fourth pivot point between the proximal pivot point 11*a* and the distal pivot point 11*b* remains the same which is allowing the location of the fourth pivot point to change by activating different position of the switch 12.

The housing 14 may be arranged to encase at least partially the first protrusion 1*a* and the second protrusion 2*b* at where the first and second apertures 21, 22 are located. The housing 14 may have a bottom wall 19, parallel with the protrusions 1*a*, 2*a*, and comprising two apertures, said apertures are aligned and corresponding to the locations of the first and second apertures 21, 22 of the protrusions 1*a*, 2*a*, when the cutting tool is in the fully closed position, wherein the pins 15, 16 may pass through the apertures. The housing 14 may be fixed to the second protrusion 2*a*, for instance with a bracket-like fringe 23 fastened only to the second protrusion 2*a*, and an opening 20 for allowing the first protrusion 1*a* to slide in relation to the housing 14 and the second protrusion 2*a* when the cutting tool moves from the closed position to the open position, or vice versa.

The housing 14 may further comprise an intermediate wall 17 provided between the switch 12 and the protrusions 21, 22, and parallel with the protrusions 21, 22. The intermediate wall 17 offers better support for the switch arrangement 10 and guide the pins 15, 16 to their designated apertures 21, 22. The intermediate wall 17 may comprise two apertures, said apertures are aligned and corresponding to the locations of the first and second apertures 21, 22 of the protrusions 1*a*, 2*a* when the cutting tool is in the fully closed position. A neck 18 may surround said aperture of the intermediate wall 17 for increased support. The bracket-like fringe 23 may be integrated to the intermediate wall 17.

The switch 12 may be arranged to change its position in relation to the housing 14 via a structural feature, for example an axle 24 connected to the housing 14 where the axle 24 is at a junction between the first part 12*a* and the second part 12*b* of the switch 12. The structural feature may alternatively be a rocker plate or threads, for instance.

The switch arrangement 10 may further comprise a spring 25. The spring 25 may be connected to the first part 12*a* or to the second part 12*b* of the switch 12 in such a way that the spring 25 is arranged to hold the first part 12*a* or the second part 12*b* in a predetermined position, for instance in the pressed or raised position. To change the position of the switch 12, the user must press against the spring force. The spring force also prevents the switch 12 to change positions between the proximal pivot point 11*a* and the distal pivot point 11*b* without overcoming the spring force.

As illustrated in FIG. 5, one end of the rocker switch may comprise a shoulder 26 and the spring 25 may be a spring plate abutting the shoulder 26 of the rocker switch. The shoulder 26 may also prevent the rocker switch to raise above the predetermined position. However, other springs may be implemented, such as a torsion spring, a coiled spring, a clock spring, for example.

Figure 6:
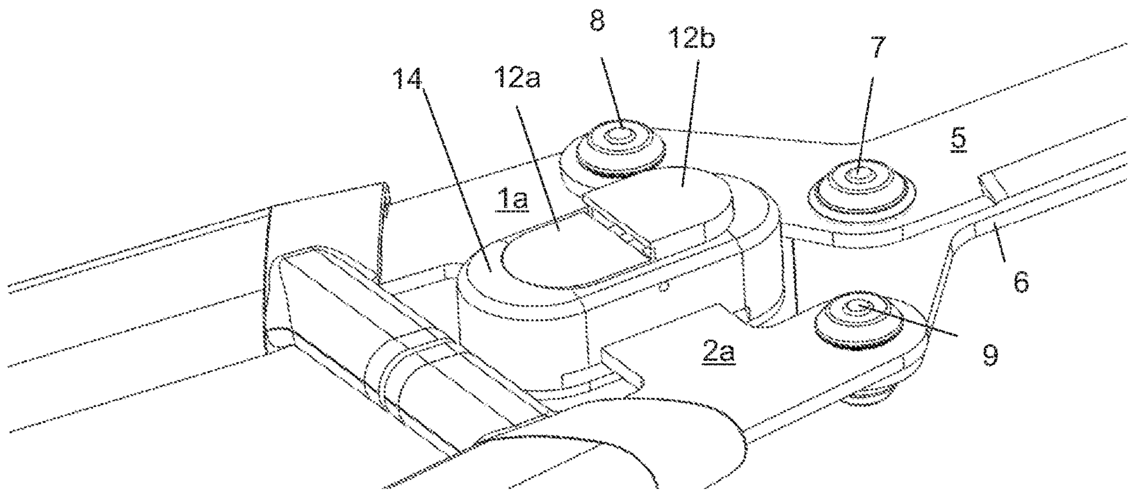
FIG. 6 illustrates a perspective view of a switch arrangement according to another embodiment.
Figure 7:
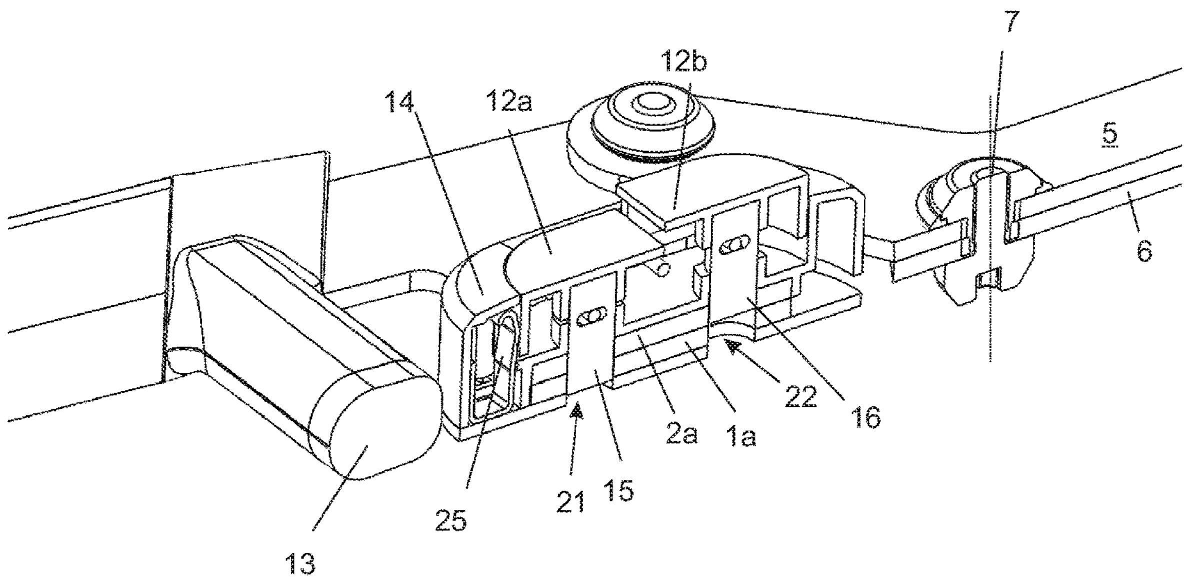
FIG. 7 illustrates a perspective cross-sectional view of the switch arrangement of FIG. 6.

FIG. 6 illustrates a perspective view of a switch arrangement according to another embodiment, and FIG. 7 a cross-sectional view thereof. The embodiment of FIG. 7 is very similar to the one explained in connection with FIG. 5. Therefore, the embodiment of FIG. 7 is mainly explained by pointing out differences.

The switch 12 in FIGS. 6-7 is shown as a double push-button switch comprising a first part 12*a* and a second part 12*b*. The first part 12*a* and the second part 12*b* may be connected to each other with a rocker, lever, slider, crank solution, for example. When the first part 12*a* is pushed down, the second part 12*b* is raised, and vice versa. The pins 15, 16 may be directly connected to the inner surface of the first part 12*a* and second part 12*b*.

Figure 8:
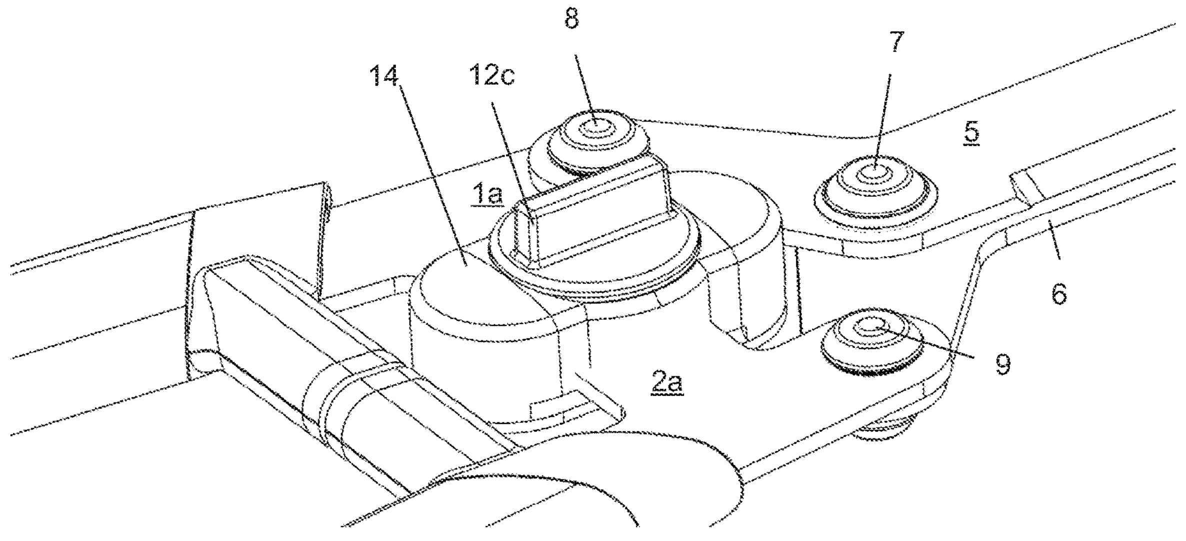
FIG. 8 illustrates a perspective view of a switch arrangement according to yet another embodiment.
Figure 9:
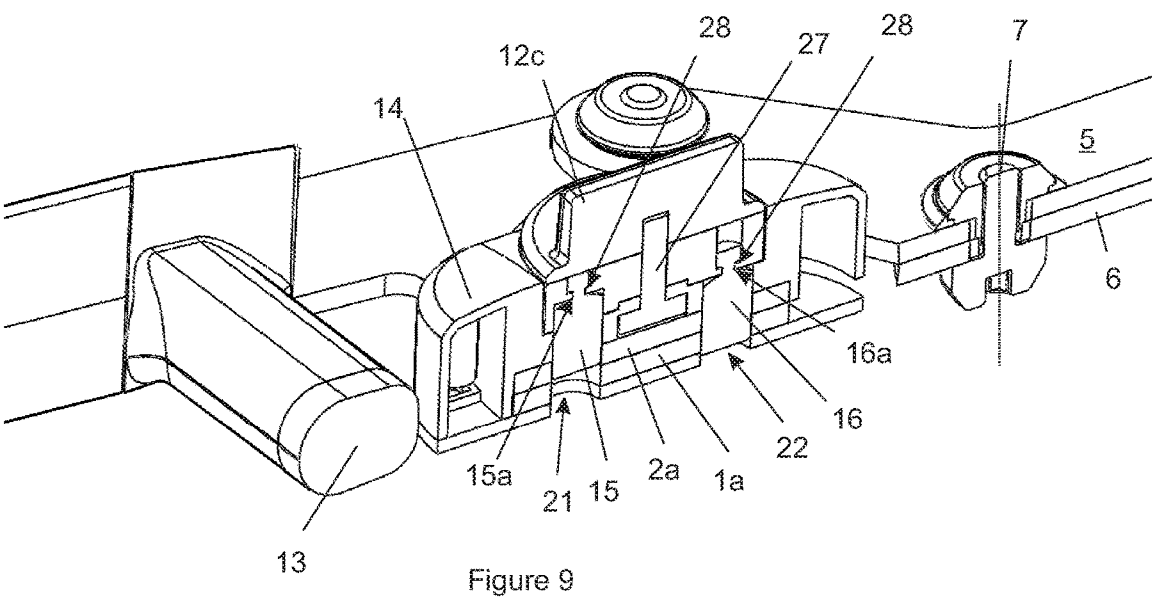
FIG. 9 illustrates a perspective cross-sectional view of the switch arrangement of FIG. 8.

FIG. 8 illustrates a perspective view of a switch arrangement according to yet another embodiment, and FIG. 9 a cross-sectional view thereof. The embodiment of FIG. 9 is very similar to the one explained in connection with FIG. 5. Therefore, the embodiment of FIG. 9 is mainly explained by pointing out differences.

The switch 12 in FIGS. 8-9 is shown as a rotary switch having a knob 12*c* which is rotatable about a shaft 27. The shaft 27 may be longitudinally parallel with the pins 15, 16. The rotary switch may comprise a grooved thread on the inner surface of the switch 12 which is slidably connected to an upper part of the pins 15, 16. The apertures 21, 22 of the first protrusion 1*a* are arranged to keep the pins 15, 16 within them. By turning the knob 12*c* to one direction, the grooved thread is arranged to raise the first pin 15 from the first aperture 21 of the protrusion 1*a* towards the knob 12*c* and simultaneously lower the second pin 16 into the second aperture 22 of the protrusion 1*a*. By turning the knob 12*c* to opposite direction or further to the first direction after a threshold has reached, the grooved thread is arranged to lower the first pin 15 into the first aperture 21 and raise the second pin 16 towards the knob 12*c*. The pins 15, 16 may comprise a neck 15*a*, 16*a*, and the grooved threads with curved edges 28 are arranged to retain the pins 15, 16 by the necks 15*a*, 16*a*.

The cutting tools such as hedge shears are designed to have a blade plane, which is defined by the cutting motion of the blades 5, 6, and a handle plane, which is defined by the opening/closing motion of the handles 1, 2. Said planes are typically not parallel but are instead slightly angled and intersecting each other for better ergonomics, usually at the point where the blades 5, 6 are attached to the handles 1, 2.

The present invention provides a symmetric trajectory for the user's arms during the cutting motion. This is not obtained with cutting tools having gears as the gear mechanism has at least two gear sections whereby one gear section provides a pivot point for the first handle and the adjacent gear wheel provides a pivot point for the second handle, making one handle to have a larger rotation angle than the other one and thus, resulting in an asymmetric handle motion. The asymmetric handle motion tends to stress hand differently and lead to quicker fatigue.

With the gear-free cutting tool according to the invention, the rotation angle for both the first handle 1 and the second handle 2 remains identical, thus providing the symmetrical motion for the user. The symmetry facilitates targeting the cutting to the desired location and is more ergonomic for the user.

The aim of the present invention is to provide an ergonomic cutting tool having symmetrical motion from the open position to the fully closed position, and the possibility to change the fourth pivot point for longer lever when cutting thicker branches and for shorter lever when cutting speed is more desirable.

It is to be understood that the above description and the accompanying figures are only intended to illustrate the present invention. It will be obvious to a person skilled in the art that the invention can be varied and modified without departing from the scope of the invention.

The invention claimed is:

1. A cutting tool, comprising:

a first blade having a cutting edge, a second blade having a cutting edge, and pivotally connected to the first blade defining a first pivot point, a first handle pivotally connected to the first blade defining a second pivot point, the first handle comprising a first protrusion, a second handle pivotally connected to the second blade defining a third pivot point, the second handle comprising a second protrusion, each of the first protrusion and the second protrusion comprising a first aperture and a second aperture, wherein:

the first handle is pivotally connected to the second handle via a switch arrangement that defines an adjustable fourth pivot point, the switch arrangement comprises a switch allowing a user to change location of the fourth pivot point from a proximal pivot point to a distal pivot point, the switch comprises a first part and a second part, wherein the first part of the switch is connected to a first pin, and the second part of the switch is connected to a second pin, and the first pin is arranged to pass through both first apertures defining the proximal pivot point when the first part of the switch is pressed, and the second pin is arranged to pass through both second apertures at the distal pivot point when the second part of the switch is pressed.

2. The cutting tool as claimed in claim 1, wherein the first pivot point, the distal pivot point and the proximal pivot point are aligned on a same symmetry axis, when the cutting tool is in a fully closed position.

3. The cutting tool as claimed in claim 1, wherein the first blade and the first handle being substantially symmetric to the second blade and the second handle, and distances between the first pivot point and the second pivot point, and the first pivot point and the third pivot point are identical.

4. The cutting tool as claimed in claim 1, wherein distances between the second pivot point and the fourth pivot point, and the third pivot point and the fourth pivot point are identical, when the cutting tool is in a fully closed position.

5. The cutting tool as claimed in claim 1, wherein said protrusions have at least one planar surface wherein the protrusions are slidable in relation to each other.

6. The cutting tool as claimed in claim 5, wherein said first apertures and second apertures of each protrusion are aligned when the cutting tool is in a fully closed position.

7. The cutting tool as claimed in claim 5, wherein the switch arrangement comprises a housing arranged to encase at least partially the first protrusion and the second protrusion, where the first apertures and the second apertures are located.

8. The cutting tool as claimed in claim 7, wherein the housing comprises an intermediate wall parallel with the protrusions.

9. The cutting tool as claimed in claim 7, wherein the housing comprises an outer wall parallel with the protrusions.

10. The cutting tool as claimed claim 1, wherein the switch arrangement comprises a spring.

11. The cutting tool as claimed in claim 1, wherein the first handle comprises a shock absorber abutting a corresponding shock absorber of the second handle when the cutting tool is in a fully closed position.

12. The cutting tool as claimed in claim 1, wherein the cutting tool is gear-free.

13. A cutting tool, comprising:

a first blade having a cutting edge, a second blade having a cutting edge, and pivotally connected to the first blade defining a first pivot point, a first handle pivotally connected to the first blade defining a second pivot point, the first handle comprising a first protrusion, a second handle pivotally connected to the second blade defining a third pivot point, the second handle comprising a second protrusion, each of the first protrusion and the second protrusion comprising a first aperture and a second aperture, wherein:

the first handle is pivotally connected to the second handle via a switch arrangement that defines an adjustable fourth pivot point, the switch arrangement comprises a switch allowing a user to change location of the fourth pivot point from a proximal pivot point to a distal pivot point, and the switch comprises a first part and a second part, wherein the first part of the switch is connected to a first pin, and the second part of the switch is connected to a second pin.

* * * * *